UNITED STATES PATENT OFFICE.

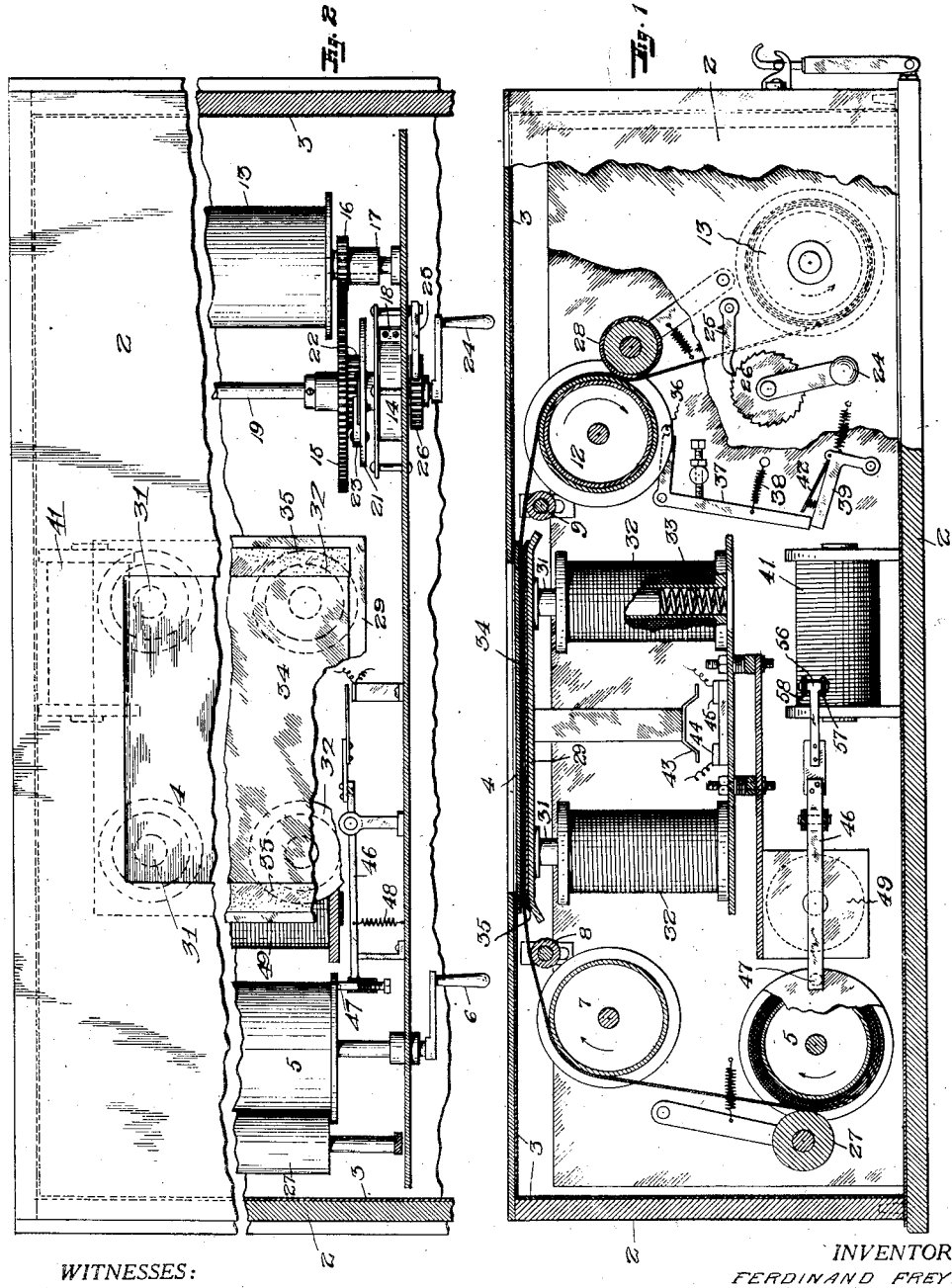

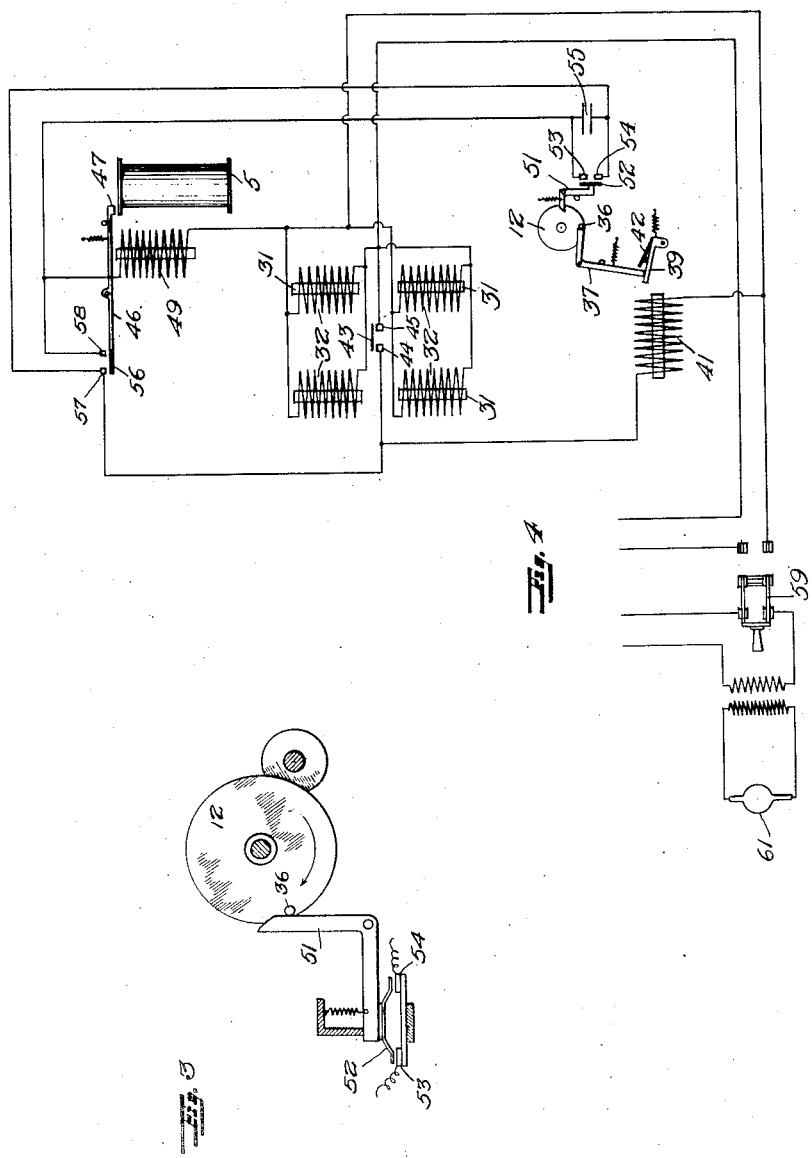

FERDINAND FREYTAG, OF SAN RAFAEL, CALIFORNIA.

APPARATUS FOR TAKING SERIAL ROENTGENOGRAMS.

1,357,391.          Specification of Letters Patent.          Patented Nov. 2, 1920.

Application filed July 24, 1916. Serial No. 110,912.

*To all whom it may concern:*

Be it known that I, FERDINAND FREYTAG, a subject of Germany, and a resident of San Rafael, county of Marin, and State of California, have invented a new and useful Apparatus for Taking Serial Roentgenograms, of which the following is a specification.

The invention relates to an apparatus for taking a series of Roentgenograms or X-ray photographs of moving portions of the anatomy.

An object of the invention is to provide an apparatus whereby a plurality of Roentgenograms of a moving organ or a moving portion of the anatomy may be taken in succession.

Another object of the invention is to provide means for advancing the sensitized film or sheet a predetermined distance whereby successive portions of the film or sheet may be subjected to the Roentgen rays.

A further object of the invention is to provide means whereby the film is moved only when the X-ray tube circuit is opened and the film is held stationary when the tube is energized.

The invention possesses other advantageous features, some of which, with the foregoing, will be set forth at length in the following description where I shall outline in full that form of the invention which I have selected for illustration in the drawings accompanying and forming part of the present specification. In the drawings I have shown one specific form of my generic invention, but it is to be understood that I do not limit myself to such form, because the invention may be embodied in a multiplicity of forms, each constituting a species of my invention.

In Roentgen ray work, when only one picture of a moving member of the anatomy is taken, there is a great liability of error in the interpretation of the picture and the diagnosis of the condition, since a certain part of the moving organ may be assumed to be in an abnormal or diseased condition, where, as a matter of fact, it only appears to be so on account of its peculiar position at the instant of exposure. By obtaining a series of pictures of the moving organ in its consecutive positions, the complete cycle of movement of the organ may be recorded and examined, and the liability of error in diagnosis eliminated.

At the present time, when it is desired to observe the movement of an organ, the fluoroscopic screen is usually employed, but this method possesses several disadvantageous features. The screen does not possess the sensitiveness of the sensitized film or plate and no permanent record is produced for mature study. With the apparatus of my invention, however, a series of photographs showing all of the details are produced, which can be subsequently subjected to critical examination.

In the accompanying drawings:

Figure 1 is a side view of the film manipulating apparatus of my invention, parts thereof being broken away and parts being shown in section to illustrate the construction.

Fig. 2 is a top or plan view of the apparatus shown in Fig. 1, parts thereof being broken away to reduce the size of the figure and to disclose the interior of the apparatus.

Fig. 3 is a detail of a portion of the film controlling apparatus.

Fig. 4 is a diagrammatic representation of the electric circuits of the apparatus.

The apparatus of my invention comprises a suitable box or casing 2 which is provided with a shield 3 of lead or other X-ray impervious material, at the top and preferably also on the sides, to prevent the rays from entering the casing. The shield and the casing are provided at the top with an aperture which is closed by a plate 4 of material such as aluminum, which is pervious to X-rays and opaque to light rays. The film on which the picture is taken is arranged within the casing and passes under the plate 4, at which area it is subjected to exposure.

Arranged in the casing is a reel or spool 5 upon which the unexposed film is wound, the reel being turned by the handle 6. From the reel 5, the film passes over idler rollers 7 and 8 and under the aluminum plate 4, thence over the idler 9 and the measuring roll 12 to the take-up reel 13 on which it is wound. The take-up reel 13 is rotated by a spring 14 which imparts rotation in one direction to the reel through the gears 15 and 16. The gear 16 is formed on a sleeve 17 so that it may be moved out of mesh with gear 15, when it is desired to freely rotate the reel 13, for removing the film or otherwise. One end of the spring 14 is attached to a fixed support 18 and the other end is attached to the shaft 19, to which the disk 21 is also attached. Secured to the gear 15 is a ratchet 22 which is engaged by a spring pressed pawl 23, pivoted on the disk 21, the gear 15 being rotatably mounted on the shaft. The spring is wound by a handle 24 attached to the shaft and the spring is prevented from unwinding when the gear 16 is shifted, by means of a pawl 25 engaging a ratchet 26 secured to the shaft. The film is held tight on the reel 5 by a spring-pressed roll 27 and is held against the rubber-surfaced measuring roll 12 by the spring-pressed roller 28, the friction of the film on the measuring roll being sufficient to prevent the spring 14 from moving the film when the measuring roll is stationary.

Means are provided for pressing the film firmly against the aluminum plate when the film is at rest and before the X-ray tube circuit is closed, to bring it into the proper focal plane, and for subsequently releasing the pressing means, so that the film may be moved a predetermined distance. Supported below that portion of the film which lies below the aluminum plate is a vertically movable platform 29 which is preferably carried by four solenoid cores 31, which lie within the solenoids 32. The cores are normally pressed upward by springs 33, arranged within the solenoids, thereby holding the platform pressed firmly against the film. When the solenoids are energized, the cores are pulled downward, releasing the film. The platform is preferably provided on its upper surface with an intensifying screen 34 and is provided with a border 35 of felt or similar material so that the film will not be scratched.

Means are also provided for allowing the film to advance a predetermined distance under the pull of the spring 14 when the film is released by the presser platform. The film passes over and frictionally engages the rotatable measuring roll 12, which is preferably of such diameter that one rotation thereof allows the film to advance a sufficient distance to move the exposed surface from below the exposure area and to move an unexposed portion into place. The flange of the measuring roll is provided with a stop 36 which is normally engaged by a lever 37 held in position by a spring 38. Arranged adjacent the free end of the lever is a spring-held pivoted armature 39 which is pulled downward when the electro-magnet 41 is energized. Pivoted to the armature is a latch 42, which in the downward movement of the armature engages the lever 37 and moves it out of contact with the stop 36, allowing the measuring roll to rotate under the pull of the film. The contact between the lever 37 and the latch 42 is momentary, the latch merely operating to strike the lever and move it out of contact with the stop and then release the lever, so that its upper end again moves back into the path of the stop. The latch is spring-pressed, so that when the armature is released, the latch springs back past the end of the lever. The electro-magnet 41 is energized as soon as the presser platform is depressed. Secured to the platform is a contact bridge 43, which, when the platform is depressed, engages the contacts 44—45 in the circuit of electromagnet 41 and closes such circuit as shown in Fig. 4.

Means are also provided for arresting the movement of the rotating parts and for placing the film in tension before it has advanced its full distance. Pivoted in the case is a lever 46 carrying on one end an adjustable brake 47 which normally contacts lightly with the end of reel 5, and from which it is normally held from strong contact by a spring 48. Arranged adjacent the lever is an electro-magnet 49, which when energized moves the lever to bring the brake into strong braking contact with the reel 5. The circuit of this electromagnet is closed when the film has traveled approximately three-quarters of its movement. Arranged adjacent the measuring roll and in position to be struck by the stop 36 thereon when the measuring roll has completed a partial revolution, is a lever 51 carrying on its free end a contact bridge 52 which momentarily closes the gap between the contacts 53—54 in the circuit of electromagnet 49. As the stop leaves the lever 51 the circuit is opened at that point and a condenser 55 is shorted on the contacts to eliminate sparking. The momentary closing of the circuit energizes the electro-magnet and causes the lever 46 to move to apply the brake. The opposite end of the lever carries a contact bridge 56 which closes the gap between the contacts 57—58 in the circuit of electro-magnet 49, thereby maintaining that circuit closed when the momentary contact is opened. The brake is therefore held against the reel 5 until the supply of current to the apparatus is cut off.

One switch 59 is provided for controlling the X-ray tube 61 and the film manipulating apparatus and the switch is arranged so that when thrown in one direction it closes the tube circuit and when thrown in the other direction it opens the tube circuit and closes the apparatus circuit. The Roentgenologist stands at the switch-board and moves the switch lever back and forth, alternately energizing the tube and advancing the film. When the apparatus circuit is closed, the presser platform is moved downward, the measuring roll is released and the film moved. As the film approaches the end of its step movement the brake is applied and then the measuring roll and film is stopped. The switch is then moved to the tube side, first opening the apparatus circuit and causing the presser platform to press the section of film to be exposed firmly in place. The operator is thereby able to take a series of pictures of a moving organ in rapid succession by merely throwing the switch and the time of exposure is under his full control.

I claim:

1. The combination with a Roentgen ray tube and a circuit therefor, and means for moving a sensitized surface into position for exposure, of an electric circuit controlling said surface moving means and a single switch operating in one position to close the tube circuit and in the other position to close the circuit of the surface moving controlling means.

2. The combination with a Roentgen ray tube and a circuit therefor and means for moving a sensitized surface into position for exposure, of electromagnetic means for controlling the movement of said surface, a circuit including said electro-magnetic means and a switch for alternately closing and opening each of said circuits whereby the surface is moved only when the tube circuit is open.

3. The combination with a Roentgen ray tube and a circuit therefor and means for moving a sensitized surface into position for exposure, of electro-magnetic means for controlling the movement of said surface and means operative after said movement for pressing said surface flat.

4. The combination with a Roentgen ray tube and a circuit therefor and means for moving a sensitized surface into position for exposure, of electro-magnetic means for controlling the movement of said surface, an electric circuit including said electro-magnetic means, means normally pressing said surface and means in the control circuit for releasing said pressing means.

5. The combination with Roentgen ray tube and a circuit therefo. and means for moving a flexible sheet having a sensitized surface into position for exposure, of means normally pressing said sheet flat, means for controlling the movement of the sheet and means operatively associated with said controlling means for releasing said pressing means.

6. The combination with a Roentgen ray tube and a circuit therefor, and means for moving a flexible sheet having a sensitized surface into position for exposure, of means for normally holding said sheet taut, means for normally holding said sheet pressed flat, electro-magnetic means for controlling the movement of said sheet, a circuit for said electro-magnetic means and means in said latter circuit for releasing said pressing means.

In testimony whereof, I have hereunto set my hand at San Francisco, California, this 18th day of July 1916.

FERDINAND FREYTAG.

In presence of—
C. S. EVANS.